United States Patent
Maurer et al.

(10) Patent No.: US 11,897,384 B2
(45) Date of Patent: Feb. 13, 2024

(54) SYSTEM AND METHOD FOR VEHICLE LIGHTING-BASED ROADWAY OBSTACLE NOTIFICATION

(71) Applicant: FORD GLOBAL TECHNOLOGIES, LLC, Dearborn, MI (US)

(72) Inventors: Georg J. Maurer, Cologne (DE); Cyril Coerman, Leverkusen (DE); Uwe D. Hoffmann, Leverkusen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/086,948

(22) Filed: Dec. 22, 2022

(65) Prior Publication Data

US 2023/0211721 A1    Jul. 6, 2023

(30) Foreign Application Priority Data

Jan. 3, 2022    (DE) .......................... 102022100013.3

(51) Int. Cl.
*B60Q 1/14*    (2006.01)
*G06V 20/58*    (2022.01)

(52) U.S. Cl.
CPC ............. *B60Q 1/143* (2013.01); *G06V 20/58* (2022.01); *B60Q 2300/054* (2013.01);
(Continued)

(58) Field of Classification Search
CPC ................ B60Q 1/085; B60Q 2300/42; B60Q 2300/41; B60Q 2300/056; B60Q 1/143;
(Continued)

(56) References Cited

U.S. PATENT DOCUMENTS

| 6,281,806 B1 | 8/2001 | Smith et al. |
| 7,429,918 B2 | 9/2008 | Watanabe |

(Continued)

FOREIGN PATENT DOCUMENTS

| DE | 102014222669 A1 | 5/2016 |
| DE | 102016200683 A1 | 7/2017 |

(Continued)

*Primary Examiner* — Wei (Victor) Y Chan
(74) *Attorney, Agent, or Firm* — Frank L. Lollo; MacMillan, Sobanski & Todd, LLC

(57) ABSTRACT

A vehicle lighting-based roadway obstacle notification for a motor vehicle has a vehicle headlamp system with a controllable light distribution. A camera is aligned parallel to a forward driving direction records a part of the roadway surface lying in front of the motor vehicle which includes a multiplicity of roadway detection paths. Camera data are individually evaluated in relation to ranges and at least one quantity from among a magnitude of a vertical dimension $h_i$ of the roadway, a magnitude of a gradient $grad_{x;i}$ of the roadway, and an instantaneous speed $v_{mom}$ of the motor vehicle, with respect to the roadway detection paths. When at least one predetermined condition in respect of at least one of these quantities is complied with, the vehicle headlamp system is controlled in order to illuminate a part of the width of the roadway in which a roadway anomaly has been detected.

17 Claims, 2 Drawing Sheets

(52) U.S. Cl.
CPC .................. *B60Q 2300/112* (2013.01); *B60Q 2300/132* (2013.01); *B60Q 2300/324* (2013.01)

(58) Field of Classification Search
CPC ........ B60Q 2300/112; B60Q 2300/132; B60Q 2300/322
See application file for complete search history.

(56) References Cited

U.S. PATENT DOCUMENTS

| | | |
|---|---|---|
| 7,782,184 B2 | 8/2010 | Wittorf et al. |
| 9,829,858 B2 | 11/2017 | Christmas et al. |
| 10,406,882 B2 | 9/2019 | Lakehal-Ayat et al. |
| 10,926,798 B2 | 2/2021 | Loveall |
| 2017/0240098 A1* | 8/2017 | Sweeney ................ B60Q 1/507 |

FOREIGN PATENT DOCUMENTS

| | | |
|---|---|---|
| DE | 102019206506 A1 | 11/2020 |
| WO | 03106219 A1 | 12/2003 |

* cited by examiner

SYSTEM AND METHOD FOR VEHICLE LIGHTING-BASED ROADWAY OBSTACLE NOTIFICATION

CROSS REFERENCE TO RELATED APPLICATIONS

This application claims priority to application DE102022100013.3, filed in the German Patent and Trademark Office on Jan. 3, 2022, which is incorporated herein by reference in its entirety.

STATEMENT REGARDING FEDERALLY SPONSORED RESEARCH

Not Applicable.

BACKGROUND OF THE INVENTION

The present invention relates to vehicle lighting-based roadway obstacle notification for a motor vehicle.

In the field of vehicle technology, in particular motor vehicle technology, it is known to use vehicle-based sensors in order to detect obstacles lying on the pavement in front of the vehicle and to draw a driver's attention to the obstacle by purposeful illumination.

For example, U.S. Pat. No. 7,429,918 discloses a vehicle illumination system for illumination in front of a vehicle. The vehicle illumination system is provided with a multiplicity of light sources, which are respectively suitable for illuminating a different illumination region so as to form a predetermined light distribution pattern overall, and with a control unit for controlling the light distribution pattern by independent modification of an alignment of each of the multiplicity of light sources.

The control unit may determine a traffic scene in which the vehicle is driving, and may modify the alignment of each of the multiplicity of light sources independently in order to form a target light distribution pattern which is predetermined for this traffic scene.

The vehicle illumination system may comprise a camera for acquiring a photograph in front of the vehicle, the control unit determining the traffic scene from an image obtained by the camera. The vehicle illumination system may furthermore contain a determination unit for an obstacle, by means of which an object which the vehicle is likely to encounter is determined on the basis of an image obtained by the camera or by information obtained by a radar.

A recording unit for an obstacle may, for example, extract a bicycle or a pedestrian from images photographed by the camera in the forward direction by means of a shape match, and may determine the bicycle or the pedestrian which or who is extracted in this way as an obstacle. In this case, at least either the alignments or the amount of light of a multiplicity of light sources may be modified in order to illuminate the obstacle or the visual focus with a particular or higher light intensity.

In a further example, WO2003/106219A1 proposes a method for controlling the light distribution of a motor vehicle. The method includes steps of detecting the driving environment lying in front of the vehicle by a camera system, the detection range of which is at least greater than the range of the current light distribution of the front headlamps of the vehicle, processing the digital data of the detected driving environment by an image processing system provided in the vehicle, in order to identify potential obstacles outside the range of the current light distribution of the front headlamps, and modifying the light distribution of at least one vehicle headlamp in such a way that the potential obstacle is illuminated at least partially by the vehicle headlamp.

The camera system may record human and/or animal objects on the right road edge on the basis of the thermal radiation emitted by them and/or on the basis of their visually recordable properties, and these may be identified as such with the aid of their temperature and/or other characteristic properties, such as the contour, by the image processing system, in particular by temperature comparison and/or pattern comparison, and classified as a potential obstacle and illuminated.

By means of the camera system and the image processing system, potential obstacles in the traffic lane of the vehicle and/or in a traffic lane next to the latter may be identified.

In a further example, DE102014222669A describes a method for controlling a headlamp arrangement for a vehicle. The headlamp arrangement comprises a right headlamp and a left headlamp, the right headlamp emitting a right light beam and the left headlamp emitting a left light beam. With these light beams, it is possible to generate a first overall light distribution in which a central region is formed with a lower lighting range and side regions with a higher lighting range are formed on both sides next to this central region.

The left and right light beams for generating the first and second overall light distributions may, for example, have a substantially vertical bright/dark boundary and a substantially horizontal bright/dark boundary, so that the bright/dark boundaries of the light beams respectively have an L-shape.

In the method, an initial light distribution is generated by means of the left and right light beams, at least one object in front of the vehicle in the driving direction is recorded, the position of the object being determined and when the position of the object has been determined, a second overall light distribution is generated, in which the side regions of the first overall light distribution are superimposed at least partially at the position of the object, so that a superimposed region is formed in which the light intensity is composed of the light intensity of the left and right light beams.

The object may be a static object or a dynamic object, but in particular not an oncoming motor vehicle or a motor vehicle driving in front. A static object may for example be an obstacle on the road, for example a roadwork barrier. A dynamic object may be a pedestrian who is on the sidewalk or who wishes to cross the road or is crossing the road.

U.S. Pat. No. 7,782,184 proposes a method for driving a vehicle on a road. The method involves discovering at least one object in the immediate vicinity of the vehicle, for example in a region in front of the vehicle in the direction of travel of the vehicle, analyzing at least one discovered object, deciding whether at least one analyzed object is relevant in respect of traffic safety for driving the vehicle, and illuminating the road by means of a light source with a light pattern which shows at least one object that is regarded as relevant under the traffic safety conditions for driving the vehicle.

Objects may for example be a person, an animal, an obstacle which lies on or next to the road, a curb belonging to the road, a ditch slope, a guardrail, a snow pole, a road sign or a road marking, for instance a center line or a shoulder marking.

A step of obtaining data from the immediate vicinity of the vehicle may be carried out by means of at least one camera, a radar, or a device for obtaining the position on the basis of navigation information.

In the prior art, solutions have been proposed by means of which potholes and/or irregularities extending upward from the pavement may be detected instead of or in addition to detecting obstacles on the pavement.

For example, U.S. Pat. No. 10,926,798 describes a system and a method for showing potholes. The method for determining a position of a pothole relative to a predicted vehicle path involves activating one or more lights in a linear arrangement of lights on the basis of the position of the pothole relative to the vehicle path. The potholes may be identified by using various techniques, for example image processing, AI-based (artificial intelligence-based) models, etc., and on the basis of data of sensors, which involve for example camera, radar, infrared and/or LIDAR sensors.

The linear arrangement of lights may, for example, be arranged in a human-machine interface (HMI).

The method may furthermore contain determining two-dimensional location coordinates of the pothole on the basis of data which are received from the one or more vehicle sensors.

U.S. Pat. No. 6,281,806 discloses an object recognition and illumination system for a motor vehicle, which is intended to identify and illuminate an object in order to draw the attention of the driver of the vehicle to this object. The system involves at least one sensor for collecting information concerning the environment of the vehicle, an image processing system for receiving signals from the sensor and for generating an output signal, a light source driver system for receiving the output signal from the image processing system and for generating a light source control signal, and a light source which is activated and positioned in accordance with the control signal.

The object recognition and illumination system may furthermore implement image processing algorithms which make it possible to identify variations of the road surface such as potholes, standing water and other irregularities.

The image processing system may also receive input signals from another electronic device on-board the vehicle, in which case the device may comprise one of the group consisting of a navigation system, brake system, and cruise control system.

DE102016200683A1 proposes a device and a method for identifying an obstacle on a road in the driving direction of the vehicle, which may in particular be formed on a two-wheeled vehicle. In this case, any object which prevents the vehicle from or hinders the vehicle in passing over the corresponding location is intended to be identified as an obstacle. For instance, either a branch or damage to the road, for example by a pothole, may be identified as an obstacle.

The identification of the obstacle is in this case carried out by recording the state of the road in the direction of travel. Information about the state of the road may be recorded by means of a radar sensor or an ultrasonic sensor or a camera system. In this way, it is possible to identify whether there is an item on the road or the road per se is damaged. As a function of such an object which is a hindrance to traveling, the obstacle is illuminated according to the invention by means of a lamp so that the driver is aware of this obstacle. For example, the identified object may be illuminated in such a way that it is visually highlighted from the road.

In this case, at least two classes of different obstacles may be identified, an illumination means illuminating the obstacle differently, in particular with different colors, according to the identified class.

By the purposeful lighting of the object impeding travel, the driver may brake or demonstrate in good time.

In a further example, U.S. Pat. No. 9,829,858 describes an illumination device for generating a controllable light beam for the illumination of a scene, the device containing an addressable spatially resolving light modulator which is arranged in order to provide a selectable phase delay distribution for a beam of incident light; Fourier optics which are arranged in order to receive the phase-modulated light from the spatially resolving light modulator and to generate a light distribution; and projection optics which are arranged in order to project the light distribution in order to form an illumination pattern according to the controllable light beam.

The illumination device may, by using a computer-generated phase-only hologram, be used in order to generate a light spread for an illumination device such as a headlamp. The holographic reconstruction (or the reconstructed image) is projected with the aid of the projection optics, for example onto a highway, in order to generate a light spread in space. Since the computer-generated hologram can be modified flexibly or rapidly, the projected light spread may also be modified dynamically. For example, the projected light spread may be moved or steered. The system may therefore be integrated into the headlamp of a vehicle in order to allow controllable illumination. The computer-generated hologram may be modified in real-time in order, for example, to offer dynamically varying illumination for a driver.

The computer-generated hologram may, for example, be modified in response to the road or the driving conditions. With the aid of the illumination device, identification of a deviation of the road surface, in particular a pothole, may be made possible. Identification of the position of a predetermined object of a scene can also be made possible with the aid of the device, and additional illumination of the predetermined object of the scene can be made possible with the aid of the modification of a set of phase delays in the spatial light modulator.

It is furthermore known in the prior art to use detection of irregularities and/or potholes in the pavement lying in front of the vehicle in the driving direction in order to adapt chassis properties to the pavement.

For instance, U.S. Pat. No. 10,406,882 discloses a method for operating a suspension system for a vehicle. In the method, at least one adjustable damping means of the suspension system is controlled with a control signal in order to dynamically adapt the damping characteristic of the damping means. In this case, the control signal is generated on the basis of current data concerning the driving dynamics and previously optically recorded information concerning a supporting ground region, by estimating the expected movement of a structure of the vehicle from the current data concerning the driving dynamics, on the basis of which a first control term for the control signal is calculated.

For obtaining the data concerning the driving dynamics, suitable sensors for estimating the suspension movements of the vehicle structure may be used, in order to calculate the appropriate control signal on the basis of the first control term for the respective damping means. The calculation is preferably carried out on the basis of the movement quantities: roll and pitch as well as the yaw in the height direction of the vehicle. Besides recording these movement quantities by means of corresponding sensors, in particular the pitch rate of the vehicle may preferably be calculated on the basis of the recorded data concerning the driving dynamics.

From the optically recorded information, an absolute height profile of the supporting ground region is calculated, and a second control term for the control signal is respectively calculated or varied by its relevant height points deviating from one another in their height placements, the absolute height profile being based on a previously calculated relative height profile which is post-processed so as to obtain the absolute height profile, in order to compensate for the self-movements of the structure and/or the vehicle. Exclusively the absolute height profile is used as a basis for calculating the second control term, since only this contains a cleaned model of the real supporting ground, in which the height points may be identified well.

The reaching of a relevant height point with a vehicle wheel associated with the damping means is calculated as a function of the driving direction and/or the speed of the vehicle, by reconstructing the missing height points between the recording region and the wheel which is associated with the damping means. The associated second term is taken into account when reaching the height point in the generation of the respective control signal. Finally, both control terms, that is to say the first control term and the second control term, are advantageously used in order to generate an appropriate control signal on the basis thereof, with which the associated damping means is then controlled.

With the method, at any instant at least until reaching relevant height points of the supporting ground region, these are taken into account in the generation of a control signal for the adjustable damping means, in order to be able to respond more rapidly to real conditions so that the stability and the comfort of the vehicle are increased.

DE102019206506A1 proposes a method for controlling a semiactive suspension of at least one wheel of a vehicle, which involves an arrangement of a vibration damper with at least one control element that can be adjusted by means of at least one actuator in various stages or continuously between hardest and softest settings. In this case, the vehicle comprises at least one sensor for recording road abnormalities and at least one control instrument connected to the sensor and to the actuator. The sensor for recording road abnormalities is for example a camera or based on RADAR, LIDAR, ultrasound, laser, vehicle-to-vehicle communication or other technologies.

The method involves moving the vehicle, recording a road abnormality in the road surface lying in front in the movement direction of the vehicle, classifying the road abnormality in relation to the vertical dimension, the gradient of the sides of the road abnormality and the speed of the vehicle, calculating a force requirement for the control element, which corresponds to the classification of the road abnormality, matching the force requirement with a current setting of the control element of the semiactive suspension, and adjusting the control element as a function of the classification of the road abnormality.

In view of the prior art which has been presented, the field of methods for warning of roadway disruptions, in particular road interruptions ("potholes") and bumps, still allows room for improvement.

SUMMARY OF THE INVENTION

An object of the invention is to provide a system and a method for reliable notification of roadway obstacles, in particular road interruptions and bumps, which as far as possible have a reduced number of false-positive reactions.

In an aspect of the invention, this object is achieved by a method for vehicle lighting-based roadway obstacle notification for a motor vehicle having the features disclosed and claimed herein, including particularly advantageous configurations of the invention.

It should be pointed out that the features and measures mentioned individually in the following description may be combined with one another in any desired technically expedient way and represent further configurations of the invention. The description additionally characterizes and specifies the invention particularly in connection with the figures.

The method according to the invention is used for vehicle lighting-based roadway obstacle notification for a motor vehicle which has a vehicle headlamp system with a controllable light distribution, at least one camera, the optical axis of which is aligned parallel to a forward driving direction, and at least one electronic control unit operatively connected to the at least one camera and to the vehicle headlamp system.

The method according to the invention involves at least the following steps:

moving the motor vehicle along a roadway, recording a part of the roadway surface lying in front of the motor vehicle in the forward driving direction by means of the at least one camera, the recorded part of the roadway surface including a multiplicity of roadway detection paths, individually evaluating camera data relating to the roadway detection paths in relation to ranges and at least one quantity from among a magnitude of a vertical dimension of the roadway, a magnitude of a gradient of the roadway in the forward driving direction and an instantaneous speed of the motor vehicle, checking compliance with at least one predetermined condition which involves at least one quantity from among a magnitude of a vertical dimension of the roadway, a magnitude of a gradient in the forward driving direction and an instantaneous speed of the motor vehicle, in order to detect roadway anomalies, and controlling the vehicle headlamp system as a function of the compliance with the predetermined condition or predetermined conditions, in order to illuminate a part of the width of the roadway, in which a roadway anomaly has been detected.

The camera is, or the cameras are, intended to provide information in respect of a range to a roadway anomaly and dimensions of a roadway anomaly in the direction of the driving path. The term "intended to" in the context of the present invention means specially programmed, configured, or arranged in order to. Because of the multiplicity of roadway detection paths, a dimension of the roadway anomaly in the transverse direction of the roadway may be estimated from the detection of a roadway anomaly along a roadway detection path or along a plurality of the roadway detection paths.

The term "roadway anomaly" in the context of the present invention is meant to include at least road interruptions ("potholes") and bumps, that is to say bulging elevations of the roadway surface, for example speed humps (speed breakers). In the context of the present invention, a "roadway" is meant to include both asphalted or otherwise sealed roads, roads made of concrete elements, or unpaved country roadways. The term "multiplicity" in the context of the present invention means in particular a number of at least two. The term "roadway detection path" in the context of the present invention means a linear path which extends parallel to the direction of the roadway. The term "camera data" in the context of the present invention means data relating to images which have been acquired by the at least one camera or the cameras. The term "evaluating camera data relating to the roadway detection paths" in the context of the present invention is also meant, besides strict evaluation at a single pixel, to include the possibility that the camera data in a predetermined vicinity of the linear path are evaluated, an average value of the camera data in the predetermined vicinity is determined in a predetermined way, and the average value which has been determined is assigned to the linear roadway detection path in question.

The term "vehicle headlamp system with a controllable light distribution" in the context of the present invention means a vehicle headlamp system whose light distribution can be adjusted by control with an external electrical signal. Thus, a "reaction" or "notification" by the system or method of the invention to the driver may be comprised of a change in light distribution.

A "motor vehicle" in the context of the present invention means an automobile, a truck, or a bus.

The proposed method may draw the attention of the driver of the motor vehicle to the roadway anomaly in good time by illuminating a detected roadway anomaly, so that sufficient time remains to carry out an evasive maneuver. A further advantage of illuminating a detected roadway anomaly is that an improved estimation and/or classification of the roadway anomaly can be made possible by improving the light conditions at the location of the roadway anomaly, so that a number of false-positive reactions may be reduced.

Furthermore, in motor vehicles which are equipped with a device for adapting chassis properties to the pavement, improved driving comfort may be achieved by the improved estimation and/or classification of the detected roadway anomaly.

Preferably, a majority of the multiplicity of roadway detection paths are arranged uniformly spaced apart from one another in the transverse direction of the roadway, so that a substantially uniform local resolution may be achieved in the transverse direction of the roadway in respect of detecting a roadway anomaly.

For example, a number of the multiplicity of roadway detection paths is six. In this way, an optimized compromise may be achieved between outlay for the individual evaluation and a local resolution in the transverse direction of the roadway in order to show a roadway anomaly as accurately as possible.

The at least one predetermined condition may, for example, involve at least a query as to whether or not a magnitude of a vertical dimension of the roadway, a magnitude of a gradient in the forward driving direction, and/or an instantaneous speed of the motor vehicle exceeds a predetermined threshold value relating thereto.

In preferred embodiments of the method, the step of controlling the vehicle headlamp system in order to illuminate the detected roadway anomaly involves the possibly illuminated part of the roadway covering at least one of the roadway detection paths along which a roadway anomaly has been detected, as well as at least a part of the roadway for the respectively neighboring roadway detection paths or, in the case of detection along an outwardly arranged roadway detection path, for a central region or edge region of the roadway. In this way, particularly good illumination of the roadway anomaly may be achieved so that lateral boundaries of the roadway anomaly may be recorded well.

Preferably, the step of controlling the vehicle headlamp system in order to illuminate the detected roadway anomaly is continued until the motor vehicle has approached the detected roadway anomaly to within a predetermined distance. In this way, the attention of the driver of the motor vehicle may be drawn to the roadway anomaly for a sufficiently long time, and an improved estimation and/or classification of the roadway anomaly may likewise be achieved during the time until the approach.

In preferred embodiments of the method, at least one of the predetermined conditions of the step of evaluating the recorded camera data is dependent on at least one of: a distance of the motor vehicle from a detected roadway anomaly, a size of a confidence level in respect of the vertical dimension $h_i$ of the roadway, the vertical dimension $h_i$ of the roadway per se, the gradient of the roadway in the forward driving direction, and the instantaneous speed of the motor vehicle.

In this way, the predetermined conditions may be implemented adaptively, so that flexible evaluation of the recorded camera data may be made possible, for example with a different sensitivity for the detection of a roadway anomaly. Thus, a number of false-positive reactions may be reduced particularly effectively.

In preferred embodiments, the method comprises the following additional steps to be carried out repeatedly after the step of completed controlling of the vehicle headlamp system with illumination of a detected roadway anomaly:

recording a part of the roadway surface lying in front of the motor vehicle in the forward driving direction by means of the at least one camera, individually evaluating camera data relating to the roadway detection paths in relation to ranges and at least one quantity from among a magnitude of a vertical dimension of the roadway, a magnitude of a gradient of the roadway in the forward driving direction and an instantaneous speed of the motor vehicle, repeating the step of checking compliance with one or more condition modified or conditions modified from the predetermined condition or the predetermined conditions, the modified condition or the modified conditions involving at least a lower requirement for compliance with the modified condition or the modified conditions.

In this way, after a first detection of a roadway anomaly, repeated recording of the roadway anomaly and its environment may be carried out with an increased sensitivity, so that a risk of false-positive detection of a roadway anomaly and/or effects of a false-positive detection of a roadway anomaly may be reduced.

Particularly advantageously, the method may be used in a motor vehicle which is equipped with an automatic dynamic lighting range regulating device, which includes at least one electronic control unit that is intended to determine an instantaneous pitch angle of the motor vehicle on the basis of received data of vehicle-based sensors and to control the vehicle headlamp system in such a way that a predetermined lighting direction angle with respect to a roadway plane is adjusted.

Such automatic dynamic lighting range regulating devices are familiar to the person skilled in the art and need not therefore be explained in more detail here.

In motor vehicles equipped in such a way, preferred embodiments of the method comprise the following additional steps:

in the event of a detected roadway anomaly, transmitting results of the step of individually evaluating the recorded camera data in relation to ranges and at least one quantity from among a vertical dimension of the roadway, a gradient of the roadway in the forward driving direction and an instantaneous speed of the motor vehicle to an electronic control unit, on the basis of a previous calibration and the transmitted results, calculating an expected time variation of the pitch movement of the body of the motor vehicle when driving over the roadway anomaly, and controlling, as a function of driving over the roadway anomaly by the motor vehicle, confirmed by signals of the vehicle-based sensors, the lighting range regulating device in order to compensate for a deviation of the lighting direction angle from the predetermined lighting direction angle with respect to a roadway plane during the pitch movement of the body of the motor vehicle on the basis of the signals of the vehicle-based sensors.

In this way, it is possible to ensure that dazzling of oncoming road users by the motor vehicle when driving over the roadway anomaly can be avoided.

In a further aspect of the present invention, a vehicle lighting-based roadway obstacle notification system for a motor vehicle is provided. The roadway obstacle notification system includes a vehicle headlamp system with a controllable light distribution, at least one camera, the optical axis of which is aligned parallel to a forward driving direction, and at least one electronic control unit operatively connected to the at least one camera and to the vehicle headlamp system.

The electronic control unit is intended to receive data relating to a part of the roadway surface lying in front of the motor vehicle in the forward driving direction which is recorded by means of the at least one camera, the recorded part of the roadway surface including a multiplicity of roadway detection paths, to individually evaluate the received data relating to the roadway detection paths in relation to ranges and at least one quantity from among a magnitude of a vertical dimension of the roadway, a magnitude of a gradient of the roadway in the forward driving direction and an instantaneous speed of the motor vehicle, to check compliance with at least one predetermined condition which involves at least one from among a magnitude of a vertical dimension of the roadway, a magnitude of a gradient in the forward driving direction and an instantaneous speed of the motor vehicle, in order to detect roadway anomalies, and to control the vehicle headlamp system as a function of the compliance with the at least one condition, in order to illuminate a part of the width of the roadway, in which a roadway anomaly has been detected.

With the proposed vehicle lighting-based roadway obstacle notification system, the equipment requirements for implementing configurations of the method according to the invention for vehicle lighting-based roadway obstacle notification are provided. The advantages described in connection with the method according to the invention are also fully applicable to the vehicle lighting-based roadway obstacle notification system.

A vehicle lighting-based roadway obstacle notification system for a motor vehicle is furthermore proposed, wherein the motor vehicle is equipped with an automatic dynamic lighting range regulating device, which includes at least one electronic control unit that is intended to determine an instantaneous pitch angle of the motor vehicle on the basis of received data of vehicle-based sensors and to control the vehicle headlamp system in such a way that a predetermined lighting direction angle with respect to a roadway plane is adjusted.

In such motor vehicles, the electronic control direction is furthermore intended in the event of a detected roadway anomaly, to employ results of individual evaluation of the recorded camera data in relation to ranges and at least one quantity from among a vertical dimension of the roadway, a gradient of the roadway in the forward driving direction, and an instantaneous speed of the motor vehicle in order, on the basis of a previous calibration, to calculate an expected time variation of the pitch movement of the body of the motor vehicle when driving over the roadway anomaly, and to control the lighting range regulating device in the event of driving over the roadway anomaly by the motor vehicle, confirmed by signals of the vehicle-based sensors, in order to compensate for a deviation of the lighting direction angle from the predetermined lighting direction angle with respect to a roadway plane during the pitch movement of the body of the motor vehicle, generated by driving over the detected roadway anomaly.

In this way, it is possible to ensure that dazzling of oncoming road users by the motor vehicle when driving over the roadway anomaly can be avoided.

The vehicle-based sensors may be part of the automatic dynamic lighting range regulating device of the motor vehicle. The vehicle-based sensors may, however, also be provided separately for the vehicle lighting-based roadway obstacle notification system.

In another preferred configuration of the invention, embodiments are advantageous in which sensors are according to the following list of possible sensor setups, depending on the intended purpose:

A: sensors for the pitch angle determination, and

B: sensors for the validation.

Preferably, the vehicle-based sensors according to list A are configured as a multiplicity of height level sensors, which are arranged on a front axle and a rear axle of the motor vehicle, or are configured as a multiplicity of acceleration sensors, which are respectively arranged wheel-individually on wheel supports of a front axle of the motor vehicle, or are configured as an inertial measurement unit (IMU) with pitch angle/speed sensors, or are configured as a sensor combination consisting of vertical and longitudinal acceleration sensors, in order to determine a pitch movement of the vehicle structure.

In a further preferred configuration of the invention, sensor embodiments according to list B are provided in order to validate the detection of an anomaly for carrying out the light compensation, validation by means of wheel-mounted chassis sensors being preferred:

1) use of one of the sensor setup options of list A, or
2) reduced set of wheel-mounted sensors, in which case it is preferred that:
   two height level sensors are provided wheel-individually on the front axle; or
   two wheel support-mounted acceleration sensors are provided wheel-individually on the front axle; or
3) in preferred embodiments of the vehicle lighting-based roadway obstacle notification system, the vehicle-based sensors comprise an image processing unit which is intended to determine a displacement of at least one object in at least two images recorded at different instants by at least one camera.

In such embodiments according to 3), the electronic control unit is furthermore intended to calculate a relative position between a chassis and a body of the motor vehicle, that is to say a pitch movement of the vehicle structure. In this way, the at least one camera may be used in a twofold function, so that the number of components may be reduced.

These said embodiments of the vehicle-based sensors of the motor vehicle have the advantage that such sensors are already widespread in modern motor vehicles.

BRIEF DESCRIPTION OF THE DRAWINGS

Further advantageous configurations of the invention are disclosed in the dependent claims and the following description of the figures, in which:

DETAILED DESCRIPTION OF PREFERRED EMBODIMENTS

In the various figures, parts which are the same are always provided with the same references, for which reason they will generally be described only once.

Figure 1:
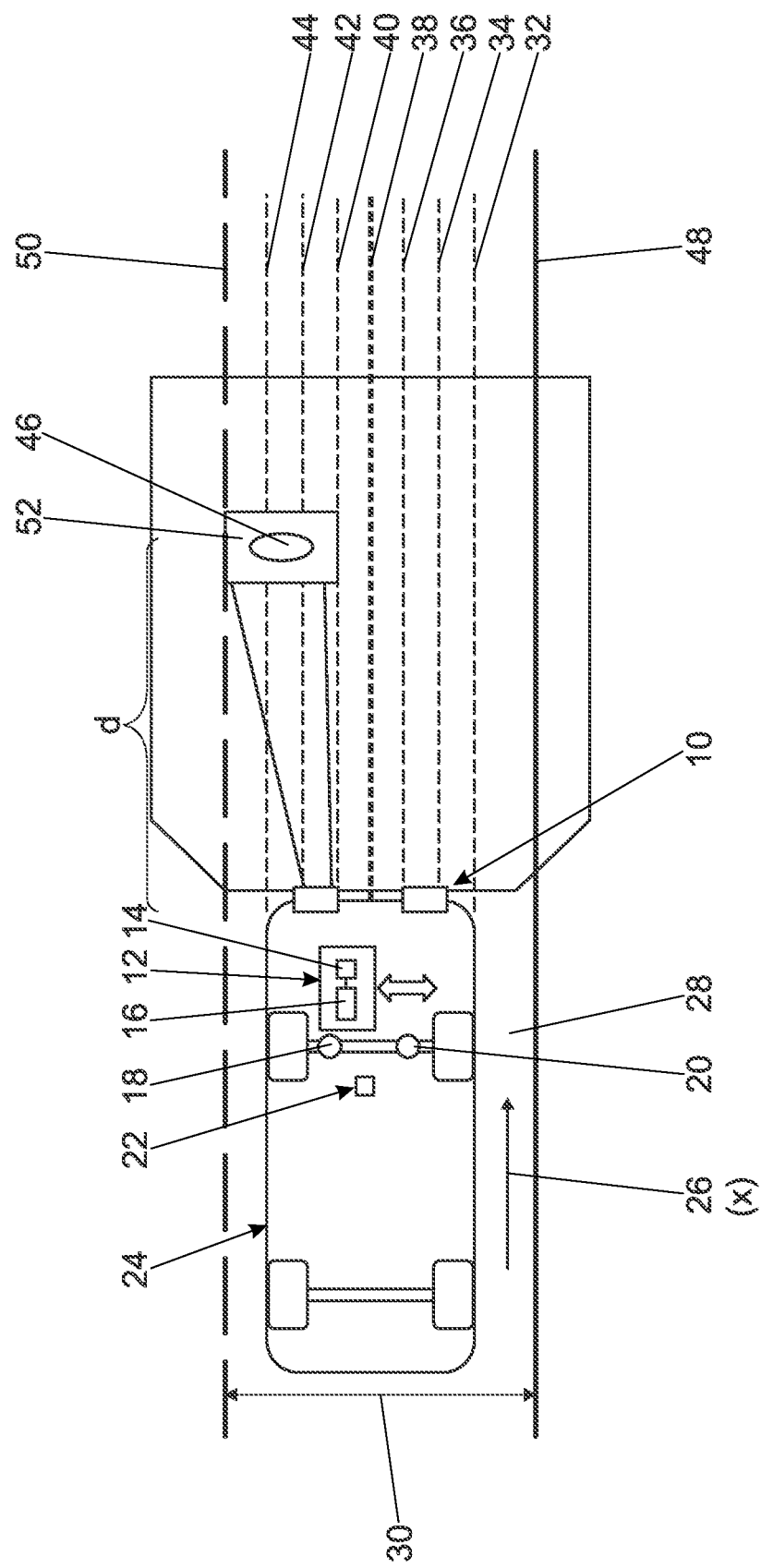
FIG. 1 shows a schematic representation of a vehicle lighting-based roadway obstacle notification system according to the invention for a motor vehicle in a plan view.

FIG. 1 shows a schematic representation of a possible embodiment of a roadway obstacle notification system according to the invention for a motor vehicle 24, which may for example be configured as an automobile, in a plan view. The motor vehicle 24 is driving on a roadway 28 of a road, which is the right roadway 28 in the plane of the drawing, and which respectively comprises a roadway 28 configured as an asphalted lane for each direction, in a forward driving direction 26.

The vehicle lighting-based roadway obstacle notification system installed in the motor vehicle 24 is equipped with a vehicle headlamp system 10 with a controllable light distribution. The vehicle headlamp system 10 may, for example, be formed by an illumination system which contains (HD) matrix LEDs or multibeam LED headlamps. Such illumination systems make it possible to focus the illumination by the vehicle headlamp onto a highly defined region by controlling it.

The vehicle headlamp system 10 is part of an automatic dynamic lighting range regulating device (not represented in detail) of the motor vehicle 24. The automatic dynamic lighting range regulating device contains an electronic control unit, which is intended to determine an instantaneous pitch angle of the motor vehicle 24 on the basis of received data of vehicle-based sensors and to control the vehicle headlamp system 10 in such a way that a predetermined lighting direction angle with respect to a roadway plane is adjusted. The vehicle-based sensors may, as in the present exemplary embodiment, be formed by a multiplicity of height level sensors 18, 20, at least two height level sensors 18, 20 respectively being arranged wheel-individually on a front axle of the motor vehicle 24 in order to detect a relative position between a chassis and a body of the motor vehicle 24.

The vehicle lighting-based roadway obstacle notification system furthermore comprises a camera 22. The camera 22 may, for example, be arranged behind the windshield of the motor vehicle 24 at the height of the rearview mirror. The optical axis of the camera 22 is aligned parallel to a forward driving direction 26 of the motor vehicle 24. The lens of the camera 22 may be configured in such a way that the field of view of the camera 22 covers at least a width 30 of the roadway 28 at a predetermined range in the forward driving direction 26 of the motor vehicle 24.

The camera 22 is intended, for example by means of software internal to the camera, in an acquired image of a part of the roadway surface lying in front of the motor vehicle 24 in the forward driving direction 26, to set up a multiplicity of roadway detection paths, in the present embodiment a number of six roadway detection paths, namely a right outer roadway detection path 32, a right middle roadway detection path 34, a right inner roadway detection path 36, a left inner roadway detection path 40, a left middle roadway detection path 42 and a left outer roadway detection path 44, each roadway detection path 32-36, 40-44 extending in the forward driving direction 26 of the motor vehicle 24. The left roadway detection paths 32-36 and the right roadway detection paths 40-44 may be arranged symmetrically with respect to a direction of the center line 38 of the motor vehicle. The right roadway detection paths 32-36 and the left roadway detection paths 40-44 are respectively arranged uniformly separated in the transverse direction of the roadway.

The camera 22 is intended to provide information relating to a range to a roadway anomaly 46 as well as dimensions of a roadway anomaly 46 in the direction of the roadway 28. For this purpose, the camera 22 as well as the vehicle headlamp system 10 are operatively connected by means of data and control lines (not represented) to an electronic control unit 12. In this case, the electronic control unit may be the automatic dynamic lighting range regulating device. Alternatively, a separate electronic control unit 12 may also be provided, which is additionally connected by data technology to the electronic control unit of the automatic dynamic lighting range regulating device.

Because of the setting up of six roadway detection paths 32-36, 40-44 in the recorded part of the roadway surface, a dimension of the roadway anomaly 46 in the transverse direction of the roadway 28 may be estimated from the detection of a roadway anomaly 46 along a roadway detection path or a plurality of roadway detection paths.

Figure 2:
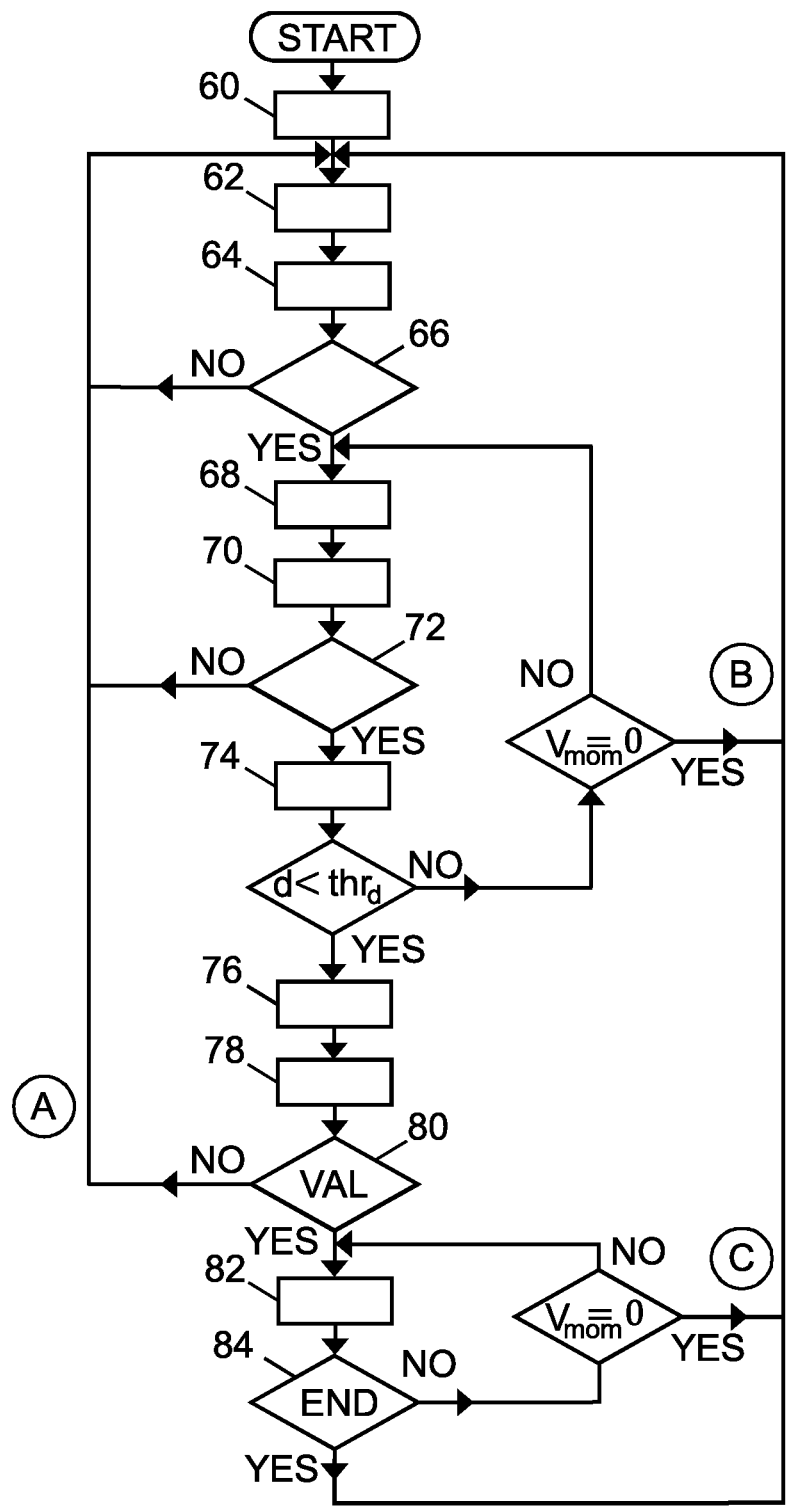
FIG. 2 shows a flowchart of a method according to the invention for vehicle lighting-based roadway obstacle notification for a motor vehicle by means of the roadway obstacle notification system according to FIG. 1.

With the aid of a flowchart, which is shown in FIG. 2, and FIG. 1, an example embodiment according to the invention of a method for vehicle lighting-based roadway obstacle notification for the motor vehicle 24 will be described below by means of the embodiment of the vehicle lighting-based roadway obstacle notification system according to the invention according to FIG. 1.

The electronic control unit 12 may comprise a digital data storage unit 16 and a processor unit 14 with access to the digital data storage unit 16. In order to carry out the method automatically, steps of the method which are to be carried out may be provided in the form of a computer program which is stored in the digital data storage unit 16, the instructions contained in the computer program being executable by the processor unit 14.

In preparation for carrying out the method, it is assumed that all devices and components involved are in a state ready for operation.

In a step 60 of the method, the motor vehicle 24 is moved along the roadway 28. During this, in a step 62 of the method, a part of the roadway surface lying in front of the motor vehicle 24 in the forward driving direction 26 is recorded by means of the camera 22, for example at uniform time intervals, and the camera data relating to the recorded part of the roadway surface are received by the electronic control unit 12 provided for this purpose. In the recorded part of the roadway surface, a multiplicity of linear roadway detection paths 32-36, 40-44 are in this case set up, the number of which in the present embodiment is six. In other embodiments, a larger number of roadway detection paths may also be set up.

In the next step 64, the received camera data are evaluated individually, that is to say roadway detection path 32-36, 40-44 by roadway detection path 32-36, 40-44, by the electronic control unit 12 provided for this purpose in relation to ranges, a magnitude of a vertical dimension $h_i$ of the roadway 28, a magnitude of a gradient $grad_{x;i}$ of the roadway 28 in the forward driving direction 26 and an instantaneous speed $v_{mom}$ of the motor vehicle 24.

In a further step 66, a check is carried out by the electronic control unit 12 provided for this purpose regarding compliance with predetermined conditions which relate to a magnitude of the vertical dimension $h_i$ of the roadway 28, a magnitude of a gradient $grad_{x;i}$ in the forward driving direction 26 and an instantaneous speed $v_{mom}$ of the motor vehicle 24, in order to detect roadway anomalies 46. The predetermined conditions in this case respectively involve a query as to whether a magnitude of the vertical dimension $h_i$ of the roadway 28 and/or a magnitude of a gradient $grad_{x;i}$ in the forward driving direction 26 (corresponding to the x direction) exceeds a predetermined threshold value $thr_h$, $thr_{grad}$ relating thereto:

$$h_i \geq thr_h(d), \; i=1\text{-}6 \qquad (1)$$

$$grad_{x;i} \geq thr_{grad}(d), \; i=1\text{-}6 \qquad (2)$$

The predetermined condition relating to the instantaneous speed $v_{mom}$ of the motor vehicle is configured as a lookup table which contains predetermined values $v_{gain}$ dependent on the instantaneous speed $v_{mom}$:

$$v_{gain} = \text{lookup}(v_{mom}) \qquad (3)$$

In this case, the threshold values $thr_h$ and $thr_{grad}$ are selected, depending on an instantaneous range d of the motor vehicle 24 from the roadway anomaly 46 and the instantaneous speed $v_{mom}$ of the motor vehicle 24, according to $$thr_h(d) = v_{gain} \cdot h_0 + \frac{d}{\alpha} \cdot \frac{1}{\Delta} \qquad (4)$$

and $$thr_{grad}(d) = v_{gain} \cdot grad_0 + \frac{d}{\beta} \cdot \frac{1}{\Delta} \qquad (5)$$

Here, $h_0$ and $grad_0$ indicate constants which can be set up relating to the vertical dimension $h_i$ and respectively the gradient $grad_{x;i}$ in the forward driving direction 26, d indicates the instantaneous distance of the motor vehicle 24 from the detected roadway anomaly 46, $\alpha$, $\beta$ indicate proportional factors, and $\Delta$ indicates the confidence level of the signals determined by the camera 22 for determining the magnitudes of the vertical dimension $h_i$ and respectively the gradient $grad_{x;i}$ in the forward driving direction 26 $grad_{x;i}$.

The respective results found relating to compliance with the predetermined conditions may be logically linked with one another in a predetermined way.

If the respective results relating to compliance with the predetermined conditions in the step 66 do not correspond to a predetermined value, no roadway anomaly is identified and the method is continued with the step 62 of recording a part of the roadway surface lying in front of the motor vehicle 24 in the forward driving direction 26 by means of the camera 22.

If the respective results relating to compliance with the predetermined conditions in the step 66 correspond to a predetermined value, a step 68 of recording a part of the roadway surface lying in front of the motor vehicle 24 in the forward driving direction 26 by means of the camera 22 and a step 70 of individually evaluating camera data relating to the roadway detection paths 32-36, 40-44 during the approach of the motor vehicle 24 to the roadway anomaly 46 is continued, for example at regular time intervals. A step 72 of checking the compliance is carried out with conditions modified from the original predetermined conditions according to (4) and (5) so that the modified conditions involve lower requirements for compliance. After the roadway anomaly 46 is detected, its environment may be checked again with an increased sensitivity, with a reduced risk of false-positive results and with a lower negative effect of a false-positive result.

If the result of the checking step 72 turns out to be negative, the method is continued with the step 62 of recording a part of the roadway surface lying in front of the motor vehicle 24 in the forward driving direction 26 by means of the camera 22

If the result of the checking step 72 turns out to be positive, the vehicle headlamp system 10 is controlled in a step 74 of the method by the electronic control unit 12 provided for this purpose in order to illuminate a part of the width 30 of the roadway 28, in which a roadway anomaly 46 has been detected.

A roadway region 52 which is illuminated in this case covers the roadway detection paths 42, 44 along which the roadway anomaly 46 has been detected, a part of the roadway 28 in the direction toward the roadway detection path 40 next to the roadway detection path 42 and a part of the roadway 28 from the roadway detection path 44 in the direction toward a road center marking 50 of the roadway 28.

If the roadway anomaly 46 is detected along the right (left) middle roadway detection path 34 (42), for example, a part of the roadway 28 around this roadway detection path 34 (42) and a part of the roadway 28 in the direction of the right (left) inner roadway detection path 36 (40) and of the right (left) outer roadway detection path 32 (44) are illuminated.

If the roadway anomaly 46 is detected along the right (left) outer roadway detection path 32 (44), for example, a part of the roadway 28 around this roadway detection path 32 (44) and a part of the roadway 28 in the direction of the right (left) middle roadway detection path 34 (42) and a part between the right (left) outer roadway detection path 32 (44) and the roadway edge marking (48) (road center marking 50) are illuminated.

If the roadway anomaly 46 is detected along the right (left) inner roadway detection path 36 (40), for example, a part of the roadway 28 around this roadway detection path 36 (40) and a part of the roadway 28 in the direction of the right (left) middle roadway detection path 34 (42) and a part of the roadway 28 in the direction of the left (right) inner roadway detection path 40 (36) is illuminated.

The illuminated part of the roadway 28 in the direction of the neighboring roadway detection path may, for example, amount to at least half of the distance between the roadway detection paths. In the case of detecting a roadway anomaly along two neighboring roadway detection paths, the roadway anomaly would be fully illuminated in a region between the neighboring roadway detection paths.

In the event of a detected roadway anomaly 46, the results of the step 70 of individually evaluating the recorded camera data in relation to ranges d to the roadway anomaly 46, the perpendicular dimension $h_i$ of the roadway 28, the gradient $\text{grad}_{x;i}$ of the roadway 28 in the forward driving direction 26, and an instantaneous speed $v_{mom}$ of the motor vehicle 24 are transmitted to the electronic control unit 12 in a further step 76 of the method if the instantaneous range d to the detected roadway anomaly 46 has fallen below a predetermined threshold value $\text{thr}_d$ and the motor vehicle 24 has not stopped. The control of the vehicle headlamp system 10 in order to illuminate the detected roadway anomaly 46 may, for example, be ended when reaching the predetermined threshold value $\text{thr}_d$ of the instantaneous range d, so that the illumination is carried out until the motor vehicle 24 has approached the detected roadway anomaly 46 to within the predetermined distance $\text{thr}_d$, because the roadway anomaly 46 then lies outside the field of view of the driver.

If the driver has stopped the motor vehicle 24 before the roadway anomaly 46 at an instantaneous range d to the detected roadway anomaly 46 which is greater than the predetermined threshold value $\text{thr}_d$, the method is continued with the step 62 of recording the part of the roadway surface lying in front of the motor vehicle 24 in the forward driving direction 26 by means of the camera 22. This possibility is denoted in the flowchart of FIG. 2 by the letter "B".

By the electronic control unit 12 provided for this purpose, in a step 78 of the method, on the basis of a previous calibration and the transmitted results in relation to the vertical dimension $h_i$ of the roadway 28, the gradient $\text{grad}_{x;i}$ of the roadway 28 in the forward driving direction 26, and the instantaneous speed $v_{mom}$ of the motor vehicle 24, a time variation of the pitch movement of the body of the motor vehicle 24 to be expected when driving over the roadway anomaly 46 is calculated.

With knowledge of the instantaneous range d to the detected roadway anomaly 46 and the instantaneous speed $v_{mom}$ of the motor vehicle 24, in the step 78 an instant of a pitch movement to be expected of the body of the motor vehicle 24 is furthermore calculated. In a step 80 of the method, driving over the roadway anomaly by the motor vehicle 24 at the calculated instant is confirmed by monitoring the signals of one of the sensor options from the aforementioned list B, or a lack of driving over is established.

If the result of the step 80 turns out to be negative, the method is continued with the step 62 of recording a part of the roadway surface lying in front of the motor vehicle 24 in the forward driving direction 26 by means of the camera 22. This may, for example, be the case if the driver of the motor vehicle 24 has driven around the roadway anomaly 46. This possibility is denoted in the flowchart of FIG. 2 by the letter "A".

The path "A" of the method is also adopted if the driver has stopped the motor vehicle 24 at a distance in front of the roadway anomaly 46 which is less than the predetermined threshold value $\text{thr}_d$, and if a lack of corresponding signals of the multiplicity of height level sensors 18, 20 is established at the calculated instant of driving over.

If the result of the step 80 turns out to be positive, in the repeatedly carried out step 82 of the method, the lighting range regulating device is controlled by the electronic control unit 12 provided for this purpose in order to compensate for a deviation of the lighting direction angle from the predetermined lighting direction angle with respect to a roadway plane during the pitch movement of the body of the motor vehicle 24 generated by driving over the detected roadway anomaly 46. For this purpose, in the step 82, the instantaneous signals of one of the installed sensor options in the aforementioned list A is employed. Known delays, which arise for example from a signal propagation time for the transmission, for instance by using a CAN bus system, are correspondingly taken into account. The step 82 of the method is carried out until one of possible conditions for termination, which has been established in a comparison step 84, occurs or when the motor vehicle 24 has stopped.

One possible condition for termination consists in the expected pitch movement of the body of the motor vehicle 24 having stabilized, which may be identified from the signals of the height level sensors 18, 20.

Another possible condition for termination consists in the motor vehicle 24 having traveled a driving distance which reaches or exceeds a predetermined threshold value after driving over the detected roadway anomaly 46.

If the driver has stopped the motor vehicle 24 while the step 82 is being repeatedly carried out, the method is continued with the step 62 of recording the part of the roadway surface lying in front of the motor vehicle 24 in the forward driving direction 26 by means of the camera 22. This possibility is denoted in the flowchart of FIG. 2 by the letter "C".

In order to carry out the step 80 of the method of confirming driving over the roadway anomaly 46, the vehicle lighting-based roadway obstacle notification system may, as an alternative or in addition to the respective at least two height level sensors 18, 20, comprise an image processing unit which is intended to determine a displacement of at least one object in at least two images recorded at different instants by the camera 22. In this case, a further step of the method is provided, in which the image processing unit determines a pitch movement of the vehicle structure.

LIST OF REFERENCES 10 vehicle headlamp system
12 electronic control unit
14 processor unit
16 digital storage unit
18 height level sensor
20 height level sensor
22 camera
24 motor vehicle
26 forward driving direction
28 roadway
30 width
32 right outer roadway detection path
34 right middle roadway detection path
36 right inner roadway detection path
38 direction of the center line of the motor vehicle
40 left inner roadway detection path
42 left middle roadway detection path
44 left outer roadway detection path
46 roadway anomaly
48 roadway edge marketing
50 road center marking
52 illuminated roadway region
d instantaneous range
Method steps:
60 moving the vehicle
62 recording a part of the roadway surface by means of cameras
64 individually evaluating camera data 66 checking compliance with predetermined conditions
68 recording a part of the roadway surface by means of cameras
70 individually evaluating camera data
72 checking compliance with modified predetermined conditions
74 controlling the vehicle headlamp system in order to illuminate a part of the width of the roadway
76 transmitting determined quantities to electronic control unit
78 calculating the expected time variation of the pitch movement
80 checking driving over the roadway anomaly
82 controlling the lighting range regulating device in order to compensate for the pitch movement
84 checking compliance with the predetermined conditions for termination

What is claimed is:

1. A method for vehicle lighting-based roadway obstacle notification for a motor vehicle which has a vehicle headlamp system with a controllable light distribution, at least one camera with an optical axis aligned parallel to a forward driving direction of the motor vehicle, and at least one electronic control unit operatively connected to the at least one camera and to the vehicle headlamp system, the method comprising the steps of:
moving the motor vehicle along a roadway;
recording camera data of a part of a roadway surface lying in front of the motor vehicle in the forward driving direction using the camera, wherein a recorded part of the roadway surface includes a multiplicity of roadway detection paths;
individually evaluating the camera data relating to the roadway detection paths in relation to ranges and at least one quantity from among a magnitude of a vertical dimension ($h_i$) of the roadway, a magnitude of a gradient ($grad_{x,i}$) of the roadway in the forward driving direction, and an instantaneous speed ($v_{mom}$) of the motor vehicle;
detecting a roadway anomaly in response to compliance of at least one from among a magnitude of a vertical dimension ($h_i$) of the roadway, a magnitude of a gradient ($grad_{x,i}$) in the forward driving direction, and an instantaneous speed ($v_{mom}$) of the motor vehicle with at least one respective predetermined condition; and
controlling the vehicle headlamp system as a function of the compliance with the respective predetermined condition in order to illuminate a part of the roadway corresponding to one of the roadway detection paths in which the roadway anomaly has been detected.

2. The method according to claim 1, wherein the at least one respective predetermined condition is comprised of a threshold.

3. The method according to claim 1, wherein the step of controlling the vehicle headlamp system in order to illuminate the detected roadway anomaly comprises the illuminated part of the roadway covering at least one of the roadway detection paths along which the roadway anomaly has been detected, as well as at least a part of the roadway for a neighboring roadway detection path, and in case the roadway anomaly is detected on an outer path of the roadway detection paths then the illuminated part of the roadway covering up until a corresponding lane edge.

4. The method according to claim 1, wherein the step of controlling the vehicle headlamp system in order to illuminate the detected roadway anomaly is continued until the motor vehicle has approached the detected roadway anomaly to within a predetermined distance.

5. The method according to claim 1, wherein at least one of the predetermined conditions of the step of detecting the roadway anomaly is dependent on at least one of a distance (d) of the motor vehicle from the detected roadway anomaly, a size of a confidence level in respect of the vertical dimension ($h_i$) of the roadway, the vertical dimension ($h_i$) of the roadway per se, the gradient ($grad_{x,i}$) in the forward driving direction, and the instantaneous speed ($v_{mom}$) of the motor vehicle.

6. The method according to claim 1, wherein after the step of illuminating the part of the roadway corresponding to the roadway detection path in which the roadway anomaly has been detected, the method further comprises repeatedly performing the steps of:
recording camera data of a part of the roadway surface lying in front of the motor vehicle in the forward driving direction using the camera;
individually evaluating camera data relating to the roadway detection paths in relation to ranges and at least one quantity from among a magnitude of a vertical dimension ($h_i$) of the roadway, a magnitude of a gradient ($grad_{x,i}$) of the roadway in the forward driving direction, and an instantaneous speed ($v_{mom}$) of the motor vehicle;
continuing to detect the roadway anomaly in response to compliance of at least one from among a magnitude of a vertical dimension ($h_i$) of the roadway, a magnitude of a gradient ($grad_{x,i}$) in the forward driving direction, and an instantaneous speed ($v_{mom}$) of the motor vehicle with at least one modified predetermined condition involving at least a lower requirement for compliance.

7. The method according to claim 1, wherein the motor vehicle is equipped with an automatic dynamic lighting range regulating device, which includes at least one electronic control unit that is intended to determine an instantaneous pitch angle of the motor vehicle in response to received data of sensors and to control the vehicle headlamp system in such a way that a predetermined lighting direction angle with respect to a roadway plane is adjusted, and wherein the method further comprises the steps of:
when the roadway anomaly is detected, transmitting results of the step of detecting the roadway anomaly in relation to ranges and at least one quantity from among a vertical dimension ($h_i$) of the roadway, a gradient ($grad_{x,i}$) of the roadway in the forward driving direction, and an instantaneous speed ($v_{mom}$) of the motor vehicle to an electronic control unit;
in response to a previous calibration and the transmitted results, calculating an expected time variation of the pitch angle of a body of the motor vehicle when driving over the roadway anomaly; and
controlling, as a function of driving over the roadway anomaly by the motor vehicle, the lighting range regulating device in order to compensate for a deviation of a lighting direction angle from a predetermined lighting direction angle with respect to a roadway plane during a pitch movement of the body of the motor vehicle according to signals from sensors including a pitch angle determination sensor.

8. A vehicle lighting-based roadway obstacle notification system for a motor vehicle that moves along a roadway, comprising:
a vehicle headlamp system with a controllable light distribution;

at least one camera having an optical axis aligned parallel to a forward driving direction; and an electronic control unit operatively connected to the at least one camera and to the vehicle headlamp system, configured to:

record camera data of a part of a surface of the roadway lying in front of the motor vehicle in the forward driving direction using the camera, wherein a recorded part of the roadway includes a multiplicity of roadway detection paths;

individually evaluate the camera data relating to the roadway detection paths in relation to ranges and at least one quantity from among a magnitude of a vertical dimension ($h_i$) of the roadway, a magnitude of a gradient ($grad_{x,i}$) of the roadway in the forward driving direction, and an instantaneous speed ($v_{mom}$) of the motor vehicle;

detect a roadway anomaly in response to compliance of at least one from among a magnitude of a vertical dimension ($h_i$) of the roadway, a magnitude of a gradient ($grad_{x,i}$) in the forward driving direction, and an instantaneous speed ($v_{mom}$) of the motor vehicle with at least one respective predetermined condition; and control the vehicle headlamp system as a function of the compliance with the respective predetermined condition in order to illuminate a part of the roadway corresponding to the roadway detection path in which the roadway anomaly has been detected.

9. The system according to claim 8, wherein the at least one respective predetermined condition is comprised of a threshold.

10. The system according to claim 8, wherein the electronic control unit is configured to illuminate the detected roadway anomaly such that the illuminated part of the roadway covers at least one of the roadway detection paths along which a roadway anomaly has been detected, as well as at least a part of the roadway for a neighboring roadway detection path.

11. The system according to claim 8, wherein the electronic control unit is configured such that illuminating the detected roadway anomaly is continued until the motor vehicle has approached the detected roadway anomaly to within a predetermined distance.

12. The system according to claim 8, wherein at least one of the predetermined conditions is dependent on at least one of a distance (d) of the motor vehicle from the detected roadway anomaly, a size of a confidence level in respect of the vertical dimension ($h_i$) of the roadway, the vertical dimension ($h_i$) of the roadway per se, the gradient ($grad_{x,i}$) in the forward driving direction, and the instantaneous speed ($v_{mom}$) of the motor vehicle.

13. The system according to claim 8, wherein the electronic control unit is further configured such that after illuminating the part of the roadway corresponding to the roadway detection path in which the roadway anomaly has been detected, the electronic control unit repeatedly:

records camera data of a part of the roadway lying in front of the motor vehicle in the forward driving direction using the camera;

individually evaluates camera data relating to the roadway detection paths in relation to ranges and at least one quantity from among a magnitude of a vertical dimension ($h_i$) of the roadway, a magnitude of a gradient ($grad_{x,i}$) of the roadway in the forward driving direction, and an instantaneous speed ($v_{mom}$) of the motor vehicle;

continues to detect the roadway anomaly in response to compliance of at least one from among a magnitude of a vertical dimension ($h_i$) of the roadway, a magnitude of a gradient ($grad_{x,i}$) in the forward driving direction, and an instantaneous speed ($v_{mom}$) of the motor vehicle with at least one modified predetermined condition involving at least a lower requirement for compliance.

14. The system according to claim 8, further comprising:

an automatic dynamic lighting range regulating device, which includes a controller that determines an instantaneous pitch angle of the motor vehicle in response to received data of sensors and controls the vehicle headlamp system in such a way that a predetermined lighting direction angle with respect to a roadway plane is adjusted;

wherein the electronic control unit is further configured to:

when the roadway anomaly is detected, employ results of individual evaluation of the recorded camera data in relation to ranges and at least one quantity from among a magnitude of a vertical dimension ($h_i$) of the roadway, a magnitude of a gradient ($grad_{x,i}$) of the roadway in the forward driving direction, and an instantaneous speed ($v_{mom}$) of the motor vehicle to calculate an expected time variation of a pitch movement of a body of the motor vehicle when driving over the roadway anomaly; and control the lighting range regulating device in response to driving over the roadway anomaly by the motor vehicle, confirmed by signals of vehicle-based sensors, in order to compensate for a deviation of the lighting direction angle from the predetermined lighting direction angle with respect to a roadway plane during the pitch movement of the body of the motor vehicle generated by driving over the detected roadway anomaly.

15. The system according to claim 14, wherein the vehicle-based sensors are comprised of (1) a multiplicity of height level sensors, which are arranged on a front axle and a rear axle of the motor vehicle, or (2) a multiplicity of acceleration sensors, which are respectively arranged wheel-individually on wheel supports of a front axle of the motor vehicle, or (3) as an inertial measurement unit with a pitch rate sensor, or (4) a sensor combination consisting of vertical and longitudinal acceleration sensors, in order to determine a pitch movement of a motor vehicle structure.

16. The system according to claim 15 wherein the vehicle-based sensors are further comprised of a reduced set of wheel-mounted sensors, wherein two height level sensors are provided wheel-individually on the front axle, or two wheel support-mounted acceleration sensors are provided wheel-individually on the front axle.

17. The system of claim 14 further comprising:

an image processing unit determining a displacement of at least one object in at least two images recorded at different instants by the at least one camera, wherein the electronic control unit calculates a pitch movement of the motor vehicle from the displacement.

* * * * *